(12) United States Patent
Burnos et al.

(10) Patent No.: US 10,519,861 B2
(45) Date of Patent: Dec. 31, 2019

(54) TRANSITION MANIFOLDS FOR COOLING CHANNEL CONNECTIONS IN COOLED STRUCTURES

(71) Applicant: General Electric Company, Schenectady, NY (US)

(72) Inventors: Daniel Robert Burnos, Greer, SC (US); Ibrahim Sezer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 15/343,369

(22) Filed: Nov. 4, 2016

(65) Prior Publication Data

US 2018/0128174 A1 May 10, 2018

(51) Int. Cl.
*F01D 25/12* (2006.01)
*F02C 7/12* (2006.01)
*F02C 3/04* (2006.01)
*F01D 11/08* (2006.01)

(52) U.S. Cl.
CPC ............... *F02C 7/12* (2013.01); *F01D 11/08* (2013.01); *F01D 25/12* (2013.01); *F02C 3/04* (2013.01); *F05D 2220/32* (2013.01); *F05D 2240/11* (2013.01); *F05D 2240/81* (2013.01); *F05D 2260/202* (2013.01); *F05D 2260/204* (2013.01); *F05D 2260/2214* (2013.01)

(58) Field of Classification Search
CPC .... F01D 11/08; F01D 25/12; F05D 2260/202; F05D 2260/204; F02C 7/12; F02C 7/16; F02C 7/18

USPC ........................................................ 415/173.1
See application file for complete search history.

(56) References Cited

U.S. PATENT DOCUMENTS

| 3,844,679 A | 10/1974 | Grondahl et al. |
| 4,353,679 A | 10/1982 | Hauser |
| 5,584,651 A * | 12/1996 | Pietraszkiewicz ...... F01D 11/08 415/115 |

(Continued)

FOREIGN PATENT DOCUMENTS

EP     2 657 451 A2    10/2013

OTHER PUBLICATIONS

Kandikar, et al., Evolution of Microchannel Flow Passages—Thermohydraulic Performance and Fabrication Technology, IMECE2002-32043, ASME International Mechanical Engineering Congress & Exposition, Nov. 17-22, 2002, pp. 1-13.

(Continued)

*Primary Examiner* — Steven M Sutherland
(74) *Attorney, Agent, or Firm* — Charlotte C. Wilson; James W. Pemrick

(57) ABSTRACT

A cooled structure of a gas turbine engine having a main body with a leading edge, a trailing edge, a first side portion, a second side portion, and a cavity. A first set of cooling air micro-channels extends from the cavity and are arranged along the first side portion. A second set of cooling air micro-channels extends from the cavity and are arranged along the second side portion. Each set of cooling air micro-channels has at least one transition manifold in fluid communication with an adjacent micro-channel and also in fluid communication with at least one of an intake end, an exhaust end, and mixtures thereof. The cooled structure described above is also embodied in a gas turbine.

15 Claims, 8 Drawing Sheets

(56) References Cited

U.S. PATENT DOCUMENTS

| | | | |
|---|---|---|---|
| 5,957,657 A | 9/1999 | Akita et al. | |
| 5,993,150 A * | 11/1999 | Liotta | F01D 11/10 |
| | | | 415/115 |
| 6,241,467 B1 | 6/2001 | Zelesky et al. | |
| 6,247,896 B1 | 6/2001 | Auxier et al. | |
| 6,905,302 B2 | 6/2005 | Lee et al. | |
| 7,653,944 B2 | 2/2010 | Dasilva et al. | |
| 7,653,994 B2 | 2/2010 | Dasilva et al. | |
| 7,900,458 B2 | 3/2011 | James et al. | |
| 7,988,410 B1 * | 8/2011 | Liang | F01D 9/04 |
| | | | 415/115 |
| 8,096,772 B2 | 1/2012 | Liang | |
| 8,109,726 B2 | 2/2012 | Liang | |
| 8,182,224 B1 | 5/2012 | Liang | |
| 8,360,726 B1 | 1/2013 | Liang | |
| 8,388,300 B1 | 3/2013 | Liang | |
| 8,449,246 B1 | 5/2013 | Liang | |
| 8,511,995 B1 | 8/2013 | Liang | |
| 8,632,298 B1 | 1/2014 | Liang | |
| 8,770,936 B1 | 7/2014 | Liang | |
| 8,845,272 B2 | 9/2014 | Weber et al. | |
| 8,870,523 B2 | 10/2014 | Kottilingam et al. | |
| 9,015,944 B2 | 4/2015 | Lacy et al. | |
| 9,127,549 B2 | 9/2015 | Lacy et al. | |
| 2005/0100437 A1 | 5/2005 | Phillips et al. | |
| 2008/0298975 A1 | 12/2008 | James et al. | |
| 2010/0226788 A1 | 9/2010 | Liang | |
| 2012/0057960 A1 | 3/2012 | Berrog et al. | |
| 2012/0057969 A1 | 3/2012 | Jiang et al. | |
| 2012/0082549 A1 | 4/2012 | Ellis et al. | |
| 2012/0114868 A1 | 5/2012 | Bunker et al. | |
| 2012/0328451 A1 | 12/2012 | Lomas et al. | |
| 2014/0126995 A1 | 5/2014 | Schick et al. | |
| 2014/0178207 A1 * | 6/2014 | He | F01D 5/20 |
| | | | 416/96 R |
| 2014/0360155 A1 | 12/2014 | Weber et al. | |
| 2015/0007581 A1 | 1/2015 | Sezer et al. | |
| 2015/0110612 A1 | 4/2015 | Brandl et al. | |
| 2017/0101891 A1 | 4/2017 | Dutta et al. | |

OTHER PUBLICATIONS

Co-pending U.S. Appl. No. 14/880,565, filed Oct. 12, 2015.
Co-pending U.S. Appl. No. 14/880,580, filed Oct. 12, 2015.
U.S. Appl. No. 14/971,383, filed Dec. 16, 2015.
U.S. Appl. No. 14/971,724, filed Dec. 16, 2015.
U.S. Appl. No. 14/971,478, filed Dec. 16, 2015.
U.S. Appl. No. 14/971,585, filed Dec. 16, 2015.
U.S. Appl. No. 14/971,674, filed Dec. 16, 2015.
Extended European Search Report and Opinion issued in connection with corresponding EP Application No. 17199314.0 dated Mar. 27, 2018.

* cited by examiner

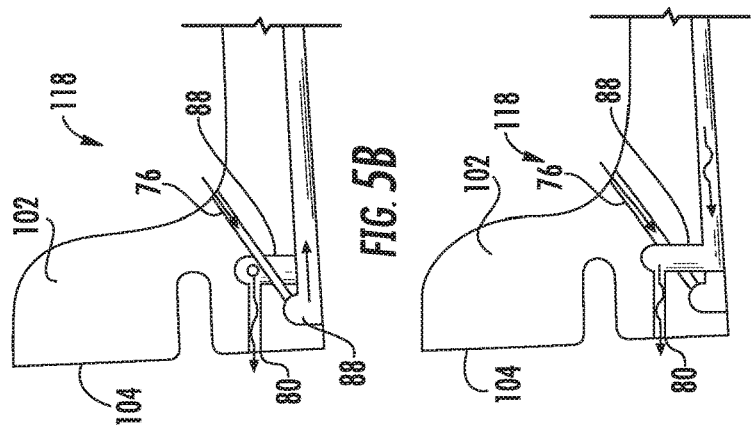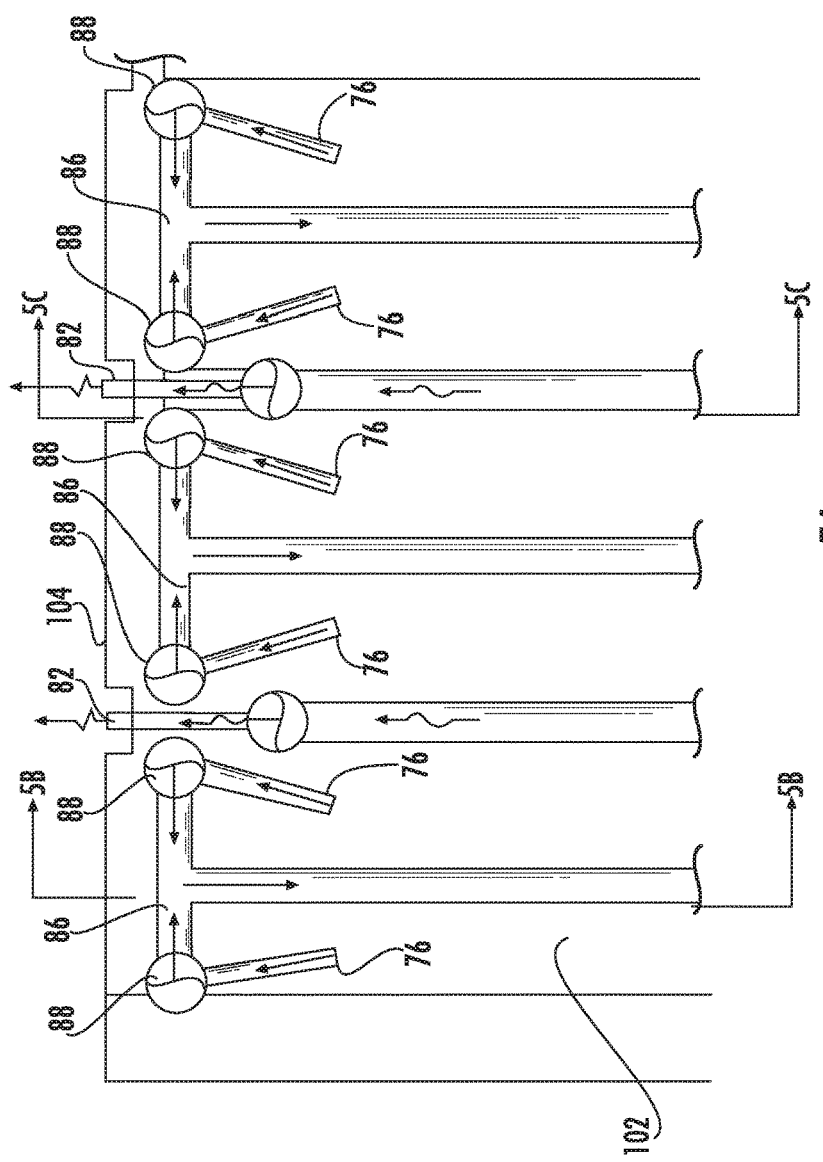

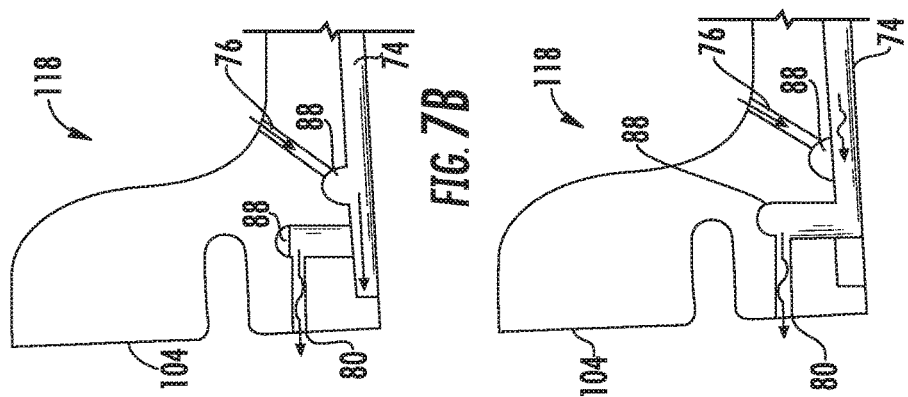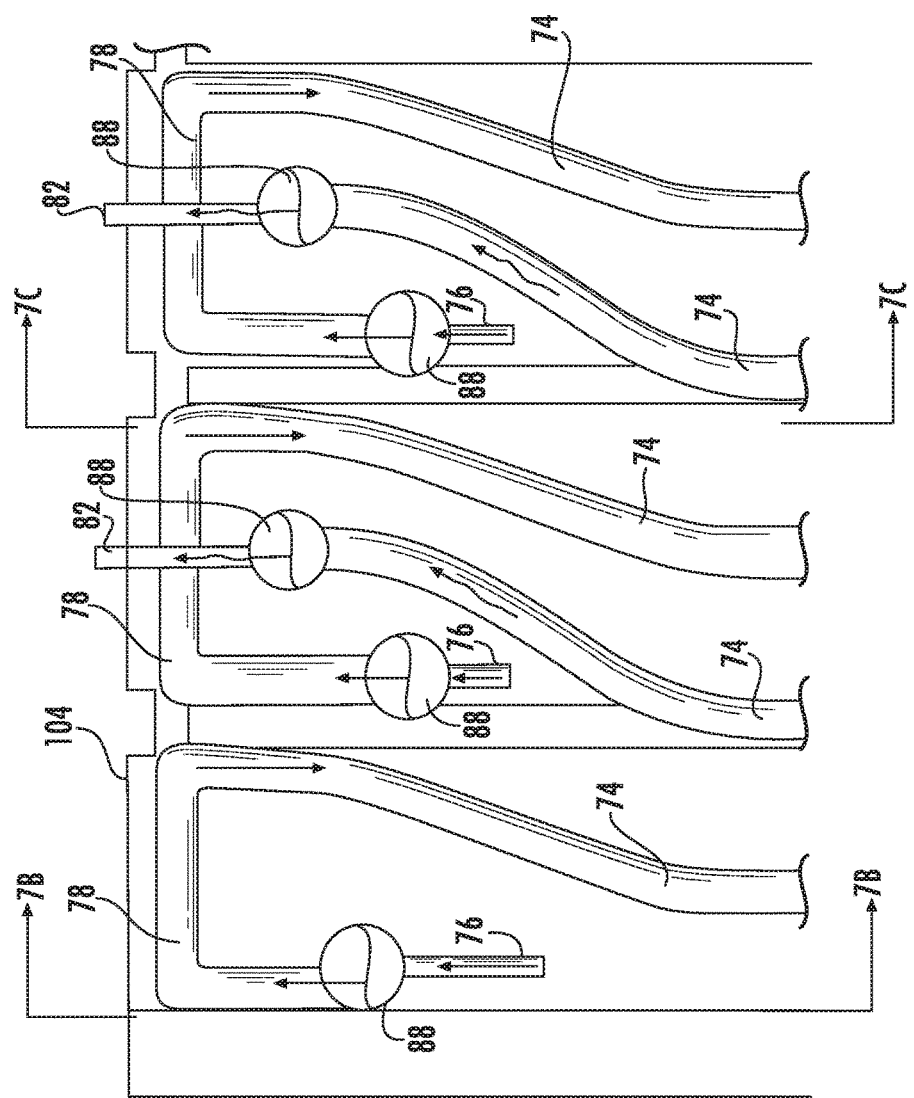

TRANSITION MANIFOLDS FOR COOLING CHANNEL CONNECTIONS IN COOLED STRUCTURES

FIELD OF THE DISCLOSURE

The disclosure relates generally to cooled structures of a gas turbine and more specifically to transition manifolds for cooling channel intake and exhaust connections that maximize and control edge cooling of the structures.

BACKGROUND OF THE DISCLOSURE

In a large frame heavy-duty industrial gas turbine engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The first and second stage airfoils (blades and vanes), as well as shrouds and other structures, must be cooled by passing cooling air through internal cooling passages and discharging the cooling air through film cooling holes to provide a blanket layer of cooling air to protect the cooled surface from the hot gas stream.

The turbine rotor blades rotate within a cooled surface formed by a shroud which forms a gap with the blade tips. The shroud is formed of many segments secured within a ring carrier. A hot gas flow leakage that passes through the gap not only decreases the turbine efficiency but also creates hot spots on the shroud that result in erosion or other thermal induced damage for a short part life.

Current manufacturing processes for micro-channel intake ends and exhaust ends require high precision machining to align the ends with the correct channel that each end serves. These manufacturing limitations prevent flexibility in the size, cross sectional area and flow area of the intake and exhaust ends for metering of cooling air flow. With current tolerance stacking, micro-channels cannot be metered.

BRIEF DESCRIPTION OF THE DISCLOSURE

Aspects and advantages of the disclosure will be set forth in part in the following description, or may be obvious from the description, or may be learned through practice of the disclosure.

One embodiment of the cooled structure of a gas turbine engine has a main body with a leading edge, a trailing edge, a first side portion, a second side portion, and a cavity. A first set of cooling air micro-channels extends from the cavity and are arranged along the first side portion. A second set of cooling air micro-channels extends from the cavity and are arranged along the second side portion. Each set of cooling air micro-channels has at least one transition manifold in fluid communication with an adjacent micro-channel and also in fluid communication with at least one, or both, of an intake end and an exhaust end.

Another embodiment has the cooled structure described above embodied in a gas turbine having a compressor section, a plurality of combustors in a combustion section positioned downstream from the compressor, and a turbine section positioned downstream from the combustion section.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIGS. 5A, 5B, and 5C are plan and section views of an embodiment of the transition manifolds and associated micro-channels.

FIGS. 7A, 7B, and 7C are plan and section views of another embodiment of the transition manifolds and associated micro-channels.

Figure 1:
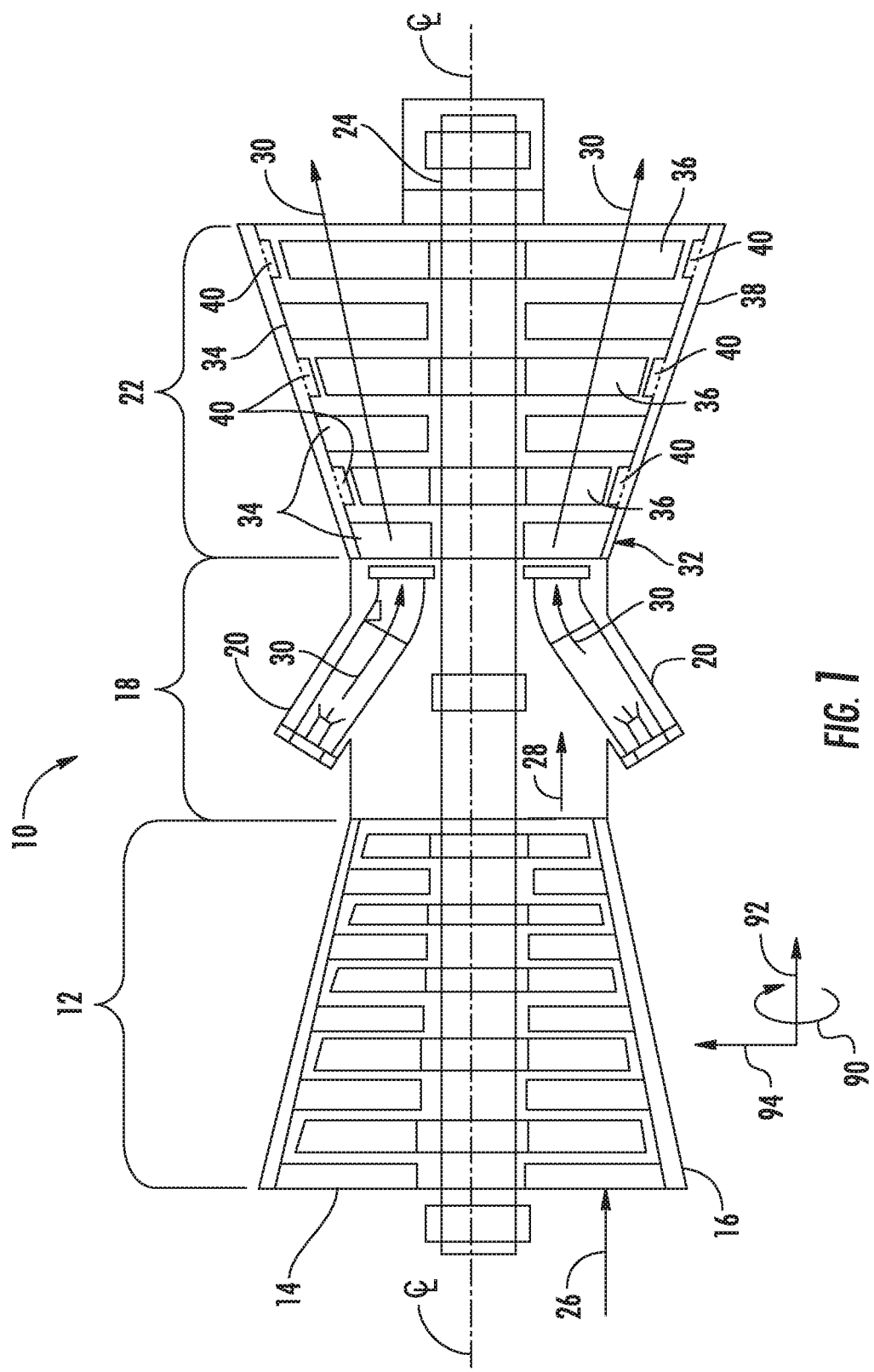
FIG. 1 is a schematic of a typical gas turbine as may incorporate various embodiments of the present invention.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component. "Cross sectional area" is defined herein as the planar area of a passage through which cooling air or other fluids travel. "Micro-channels", as used herein, are small channels having a hydraulic diameter between about 800 microns (μm) and about 3 millimeters (mm), positioned near a hot surface of a cooled structure to transport a cooling fluid, such as compressor cooling air, through the cooled structure and exchange heat in order to maintain the temperature of the hot surface region within an acceptable range. The term "set", as used herein to describe a group, is defined herein as 'at least one' micro-channel or 'at least one' element.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine and is not limited to an industrial gas turbine unless specifically recited in the claims. Although an industrial, marine, or land based gas turbine is shown and described herein, the present disclosure as shown and described herein is not limited to a land based and/or industrial, and/or marine gas turbine unless otherwise specified in the claims. For example, the disclosure as described herein may be used in any type of turbine including but not limited to an aero-derivative turbine or marine gas turbine as well as an aero engine turbine.

Cooled structures herein are defined as any structure requiring direct contact with a forced cooling air source to preserve the integrity of the structure. These structures can include portions of turbine shrouds, nozzles, blades, and any other hot gas path component of the turbine.

Transition manifolds, as described herein, are positioned near the intake ends and exhaust ends of micro-channels to provide improved line-of-sight and target area for manufacturing. Transition manifolds can be applied to any size cooling passage including conventional channels, mini-channels, micro-channels, etc. having hydraulic diameters in the range of about 0.2 millimeters (mm) to about 3 millimeters (mm). Transition manifolds can also vary in size to enable flow metering and control cooling air flow through the micro-channel. Varying manifold depth, in a generally radial direction, enables redirecting of flow around other micro-channels, or other main body features, that otherwise need a line-of-sight and sufficient material ligament to avoid possible intersection.

Transition manifolds, with larger cross-sectional areas and cooling air flow areas than the adjacent micro-channels, extending from the transition manifolds, provide a larger target for manufacturing the intake and exhaust ends and can accept larger metering holes to overcome existing manufacturing limitations. A metered area at the intake end and exhaust end allows for controlled flow and pressure that is less susceptible to manufacturing variations in channel dimensions. By routing exhaust flow up and over cooling channels located along the shroud edges instead of being routed between features, cooling channels can be moved closer together along the edges effectively cooling more of the edge surface. Intake flow can be fed and directed into channels in hard-to-reach areas at the leading edge, trailing edge or side edges of the component. Increasing the size of the landing/target transition manifold can also increase the manufacturable size of intake and exhaust ends and enable round, race track or other shaped intake/exhaust profiles and reduces risk of a back-strike during manufacturing. In some instances, a transition manifold may have a cross-sectional area equal to that of an adjacent micro-channel extending therefrom.

Transition manifolds allow flexibility in cooling air flow direction and routing depending on whether the manifold is tapped with an intake end or exhaust end. The transition manifolds can take any shape including cylinders, square, rectangular, or any other shape that will pass cooling air into the channels. The transition manifolds could be cast, drilled, EDM'd (Electrical Discharge Machining), milled, additively manufactured or any combination thereof. Single or multiple transition manifolds can be used in each micro-channel.

No additional manufacturing step is required because the transition manifold features can be incorporated into existing channel designs as an EDM plunge, milled, cast-in, printed, etc. With a slight modification to the existing EDM or casting manufacturing method, the features can be added into the same manufacturing step with the channel formation.

Referring now to the drawings, wherein like numerals refer to like components, FIG. 1 illustrates an example of a gas turbine 10 as may incorporate various embodiments of the present invention. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

Figure 2:
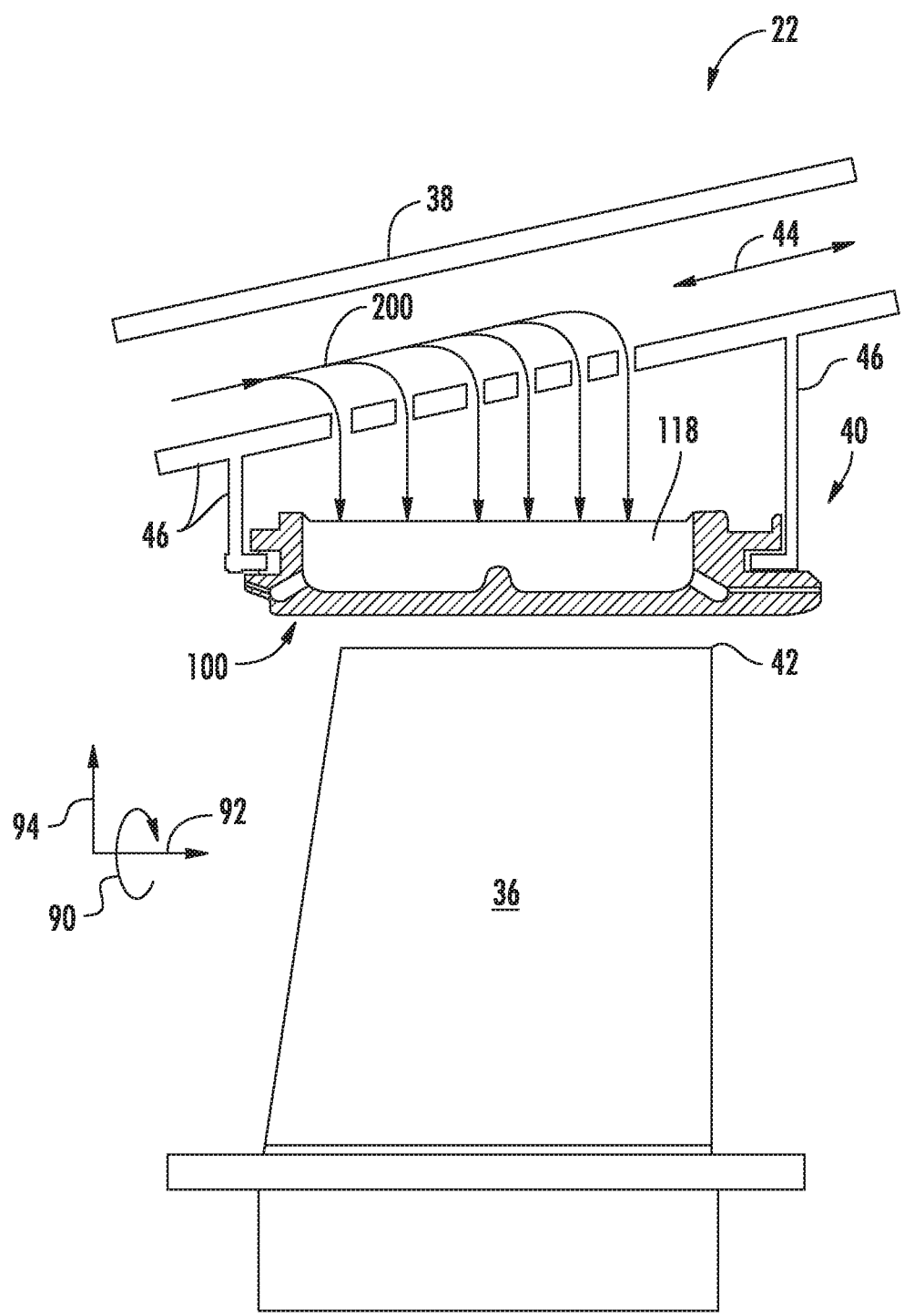
FIG. 2 is an enlarged cross section side view of a portion of the turbine section including an exemplary rotor blade and a portion of a stage two shroud block assembly according to various embodiments of the present disclosure.

FIG. 2 provides an enlarged cross section side view of a portion of the turbine section 22 including an exemplary rotor blade 36 and a portion of a stage two shroud block assembly 40 according to various embodiments of the present disclosure. As shown in FIG. 2, the shroud block assembly 40 generally extends radially between the turbine casing 38 and a tip portion 42 of the rotor blade 36. The shroud block assembly 40 is in fluid communication with a cooling flow path 44. The cooling flow path 44 may be at least partially defined by the outer casing 38. The shroud block assembly 40 generally includes mounting hardware 46 for securing the shroud block assembly 40 to the turbine casing 38 and/or for supporting a plurality of shroud block segments 100 that are arranged in an annular array around the rotor blades 36 within the turbine casing 38.

Figure 3:
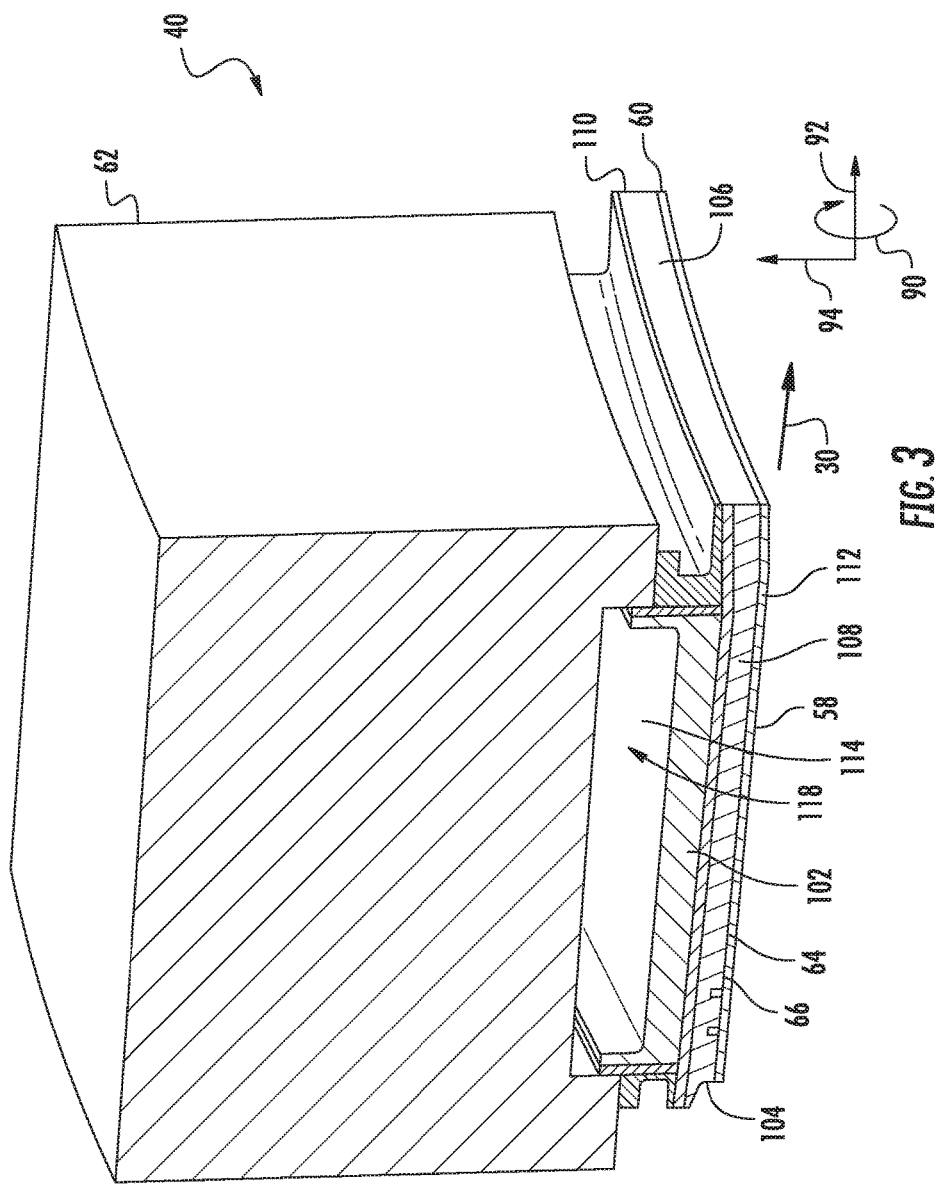
FIG. 3 is a perspective view of an embodiment of an inner turbine shroud segment coupled to an outer turbine shroud segment to form a turbine shroud block assembly, typical for stage one of a gas turbine.

FIG. 3 is a perspective view of an embodiment of an inner turbine shroud segment 60 coupled to an outer turbine shroud segment 62 to form a turbine shroud block assembly 40, typical for stage one of a gas turbine 10. The turbine 10 includes multiple turbine shroud block assemblies 40 that together form a ring about respective turbine stages. In certain embodiments, the turbine 10 may include multiple inner turbine shroud segments 60 coupled to respective outer turbine shroud segments 62 for each turbine shroud segment 40 disposed in the circumferential direction 90 about a rotational axis of the turbine 10. In other embodiments, the turbine 10 may include multiple inner turbine shroud segments 60 coupled to the outer turbine shroud segment 62 to form the turbine block assembly 40.

As depicted, the inner turbine shroud segment 60 includes a main body 102 having an upstream or leading edge 104 and a downstream or trailing edge 106 that both interface with a hot gas flow path 30. The main body 102 also includes a first side portion 108 (e.g., first slash face) and a second side portion 110 (e.g., second slash face) disposed essentially perpendicular to the leading edge 104 and the trailing edge 106. The main body 102 further includes a pair of opposed sides spaced apart from one another in a radial direction 94. Namely, the combustion gas side 112 and the back side 114 extend in the axial direction 92 between the leading and trailing edges 104, 106 and extend in the circumferential direction 90 between the first and second side portions 108, 110. In certain embodiments, the main body 102 (particularly, opposing sides 112, 114) may be arcuate shaped in the circumferential direction 90 between the first and second side portions 108, 110 and/or in the axial direction 92 between the leading and trailing edges 104, 106. The back side 114 is configured to interface with a cavity 118 defined between the inner turbine shroud segment 60 and the outer turbine shroud segment 62.

Figure 4:
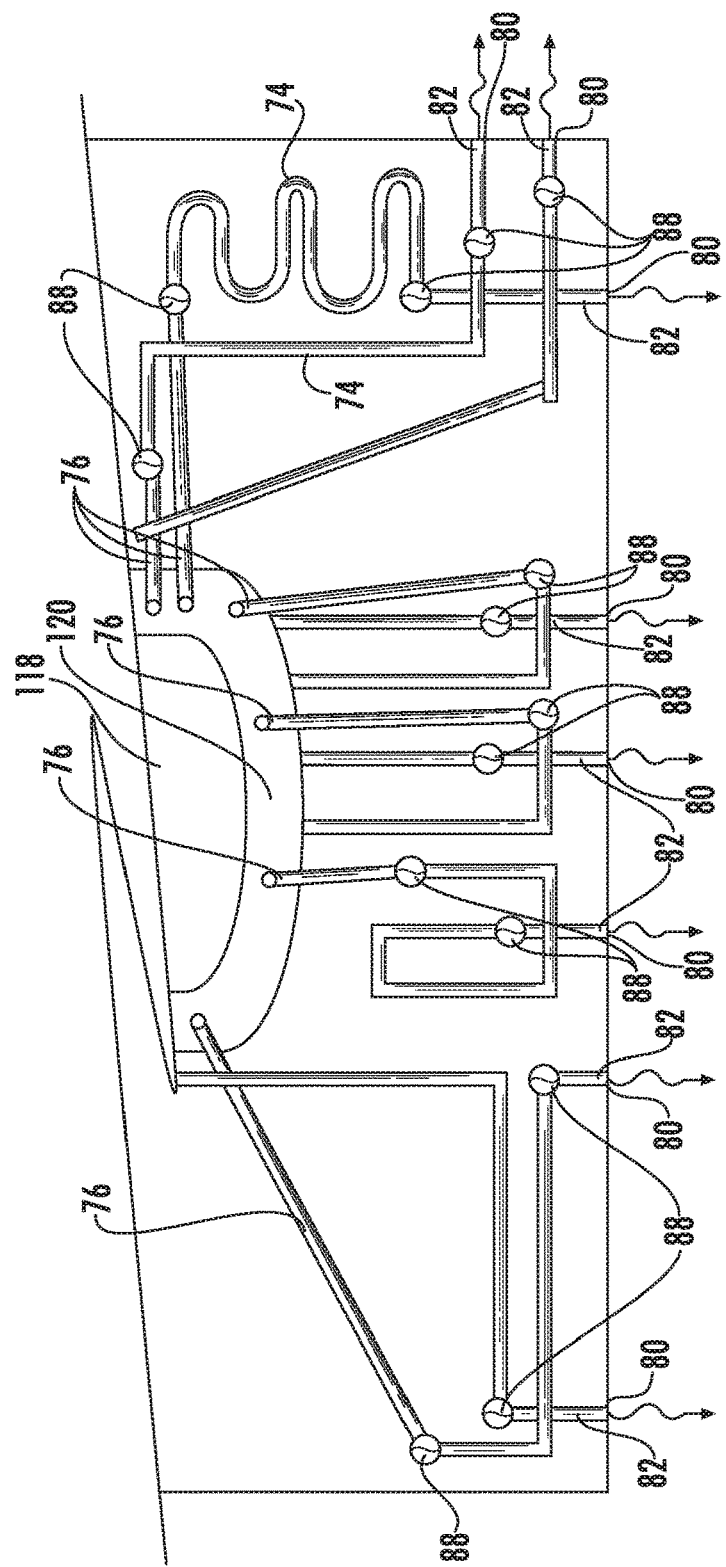
FIG. 4 is a cutaway section of a cooled structure embodiment showing various channel routings and associated positioning of transition manifolds.

FIG. 4 is a cutaway of a cooled structure embodiment showing various channels 74, their routings, and associated positioning of transition manifolds 88. As depicted, the main body 102 includes a plurality of channels 74 that extends from the angled perimeter wall 120 of the cavity 118 and that is arranged along the first side portion 108 of a cooled structure. The body 102 may include 2 to 30 or more channels 74. Each channel 74 is configured to receive a cooling medium 200 from the cavity 118 via an intake end 76 and to discharge the spent cooling medium via an exhaust end 82 at exhaust ports 80.

In certain embodiments, the channels 74 may include metering features as described above with regard to channels 74. In some embodiments, the channels, which are located near the combustion gas side 112, may be cast entirely, cut with liquid-jet guided laser technology (sometimes referred to as Liquid MicroJet), '3D-printed' with additive manufacturing processes, electrical discharge or electrochemical machining (EDM/ECM), or precision machined within the main body 102. Additive manufacturing technologies that can be used for cooled structures include binder jetting, directed energy deposition, material extrusion, material jetting, powder bed fusion, sheet lamination, vat photopolymerization, and mixtures thereof.

Example embodiments, such as those shown in FIGS. 4-7, have a main body 102 that includes many micro-channel patterns enabled by using transition manifolds 88 at different locations. The inner turbine shroud segment 60 is generally proximate to a cooling medium 200 from the compressor 12. The inner turbine shroud segment 60 includes a cavity 118 to receive the cooling medium 200, or air, from the compressor 12. The cooling medium 200 flows from the cavity 118 to the channels 74 within the main body 102 of the inner turbine shroud segment 60 via intake ends 76 disposed within the main body 102 that extend from the back side 114 to the channels 74. Each channel 74 can include a loop-shaped portion 78, as shown in FIG. 7A, or most any pattern shown in other figures. However, the routing and patterns of the micro-channels are not limited to any specific direction or orientation. The exhaust end 82 or intake end 76 may include a metering feature (e.g., a portion of the main body 102 extending into the channel that narrows a cross sectional area of a portion of the channel relative to an adjacent cross-sectional area of the channel) to regulate flow of the cooling fluid within the channel 74. In certain embodiments, each channel 74 itself (excluding the exhaust end portion) acts as a metering feature (e.g., includes a portion of the main body 102 extending into the channel). In other embodiments, intake end 76 coupled to the loop-shaped portion 78, or other channel 74 portions, may include a metering feature (e.g., portion of the main body 102 extending into the intake end 76). In certain embodiments, the channel 74 itself, the exhaust end 82, or the intake end 76, or a combination thereof includes a metering feature. In addition, the cooling fluid exits the channels 74 (and the main body 102) via the exhaust ends 82 disposed along the first side portion 108, the second side portion 110, the leading edge 104, the trailing edge 106, or combinations thereof. In certain embodiments, the channels may be arranged in an alternating pattern with a first set 68 of channels having the intake end 76 disposed adjacent the first side portion 108 and the second set 70 of channels disposed adjacent the second side portion 110, with adjacent channels having opposite orientation.

In FIGS. 4-8, supply or intake cooling airflow is depicted using straight arrow symbols and exhaust cooling airflow is depicted using 'squiggly' arrow symbols. In FIGS. 5A-5C, T-shaped portions 86 provide a larger cooling region by increasing a length of cooling channel 74 adjacent the leading edge 104. In each set of channels, the T-shaped portions 86 can be positioned adjacent each other and incorporate exhaust ends 82 from the opposing side micro-channel 74. The intake ends 76 extend from the cavity 118 to an intake transition manifold 88 that is in fluid communication with a channel 74. The exhaust ends 82 are positioned generally radially outward from the T-shaped portion 86 thereby allowing the T-shaped portions 86 to be positioned adjacent each other. Each exhaust end 82 extends from a transition manifold 88 configured to exhaust cooling air from a plurality of exhaust ports 80 positioned generally radially outward from the T-shaped portions 78. In certain embodiments, the main body 102 includes channels disposed adjacent the trailing edge 106 that are shaped different from the channels disposed on the rest of the main body 102.

For example, the channels adjacent the trailing edge 106 may each include a serpentine pattern.

Figure 6B:
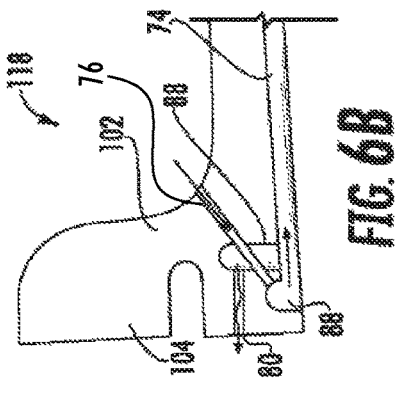
FIGS. 6A, 6B, and 6C are plan and section views of another embodiment of the transition manifolds and associated micro-channels.
Figure 6C:
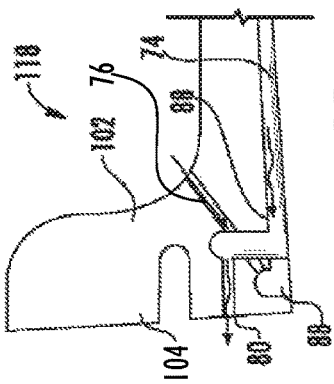
Figure 6A:
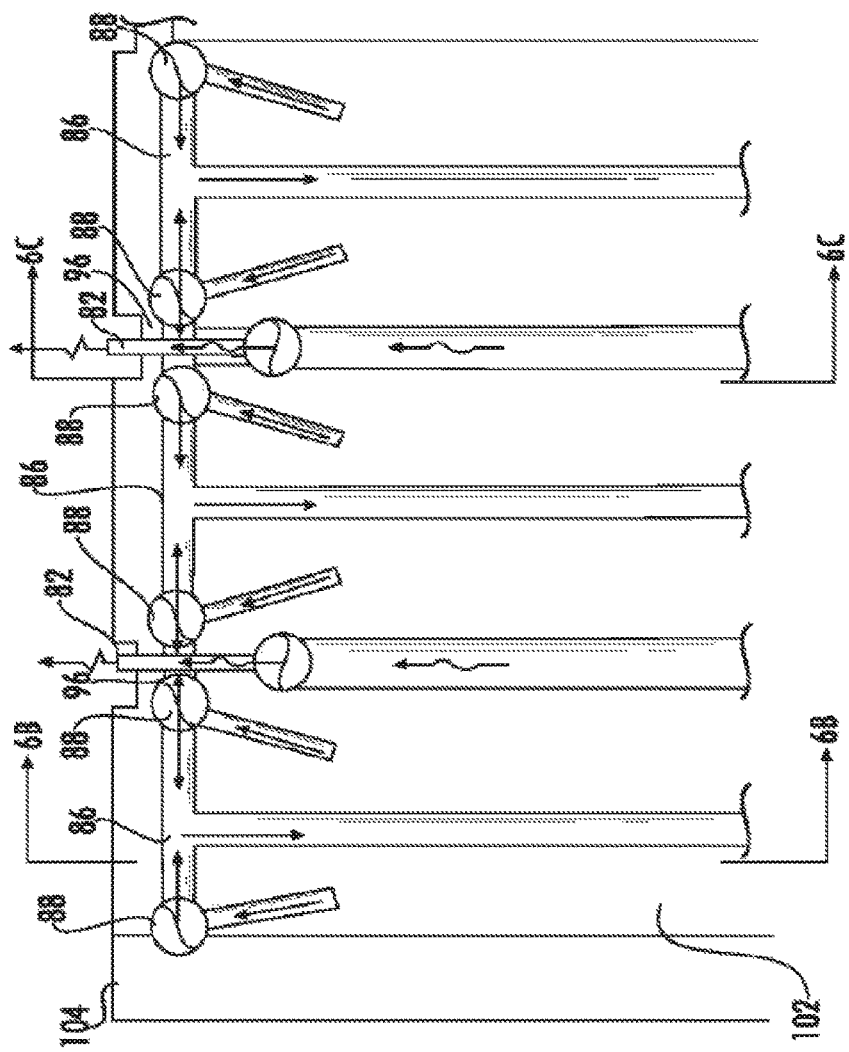

FIGS. 6A-6C provide plan and section views of an example variant of FIG. 5 having micro-channels 74 wherein the T-shaped portions 86 are interconnected with a bridge portion 96. The bridge portion 96 adds sufficient micro-channel cooling surface to the leading edge 104 such that the entire length of the leading edge 104 is cooled by a micro-channel 74. In each set of channels, the T-shaped portions 86 incorporate exhaust ends 82 from the opposing side micro-channel 74. The intake ends 76 extend from the cavity 118 to an intake transition manifold 88 that is in fluid communication with a channel 74. The exhaust ends 82 are positioned generally radially outward from the T-shaped portion 86 thereby allowing the T-shaped portions 86 to be extended by the bridge portions 96 such that the T-shaped portions 86 are in fluid communication with each other. Each exhaust end 82 extends from a transition manifold 88 configured to exhaust cooling air from a plurality of exhaust ports 80 positioned generally radially outward from the T-shaped portions 78. In certain embodiments, the main body 102 includes channels disposed adjacent the trailing edge 106 that are shaped different from the channels disposed on the rest of the main body 102. For example, the channels adjacent the trailing edge 106 may each include a serpentine pattern.

FIGS. 7A-7C provide plan and section views of an example embodiment having micro-channels 74 wherein the loop-shaped portions 78 have exhaust transition manifolds 88 positioned within the central portion of the loop. In each set of channels, the loop-shaped portions 78 incorporate exhaust ends 82 from the opposing side micro-channel 74. The intake ends 76 extend from the cavity 118 to an intake transition manifold 88 that is in fluid communication with a channel 74. The exhaust ends 82 are positioned generally radially outward from the loop-shaped portion 78. Each exhaust end 82 extends from a transition manifold 88 configured to exhaust cooling air from a plurality of exhaust ports 80 positioned generally radially outward from the loop-shaped portions 78. In certain embodiments, the main body 102 includes channels disposed adjacent the trailing edge 106 that are shaped different from the channels disposed on the rest of the main body 102. For example, the channels adjacent the trailing edge 106 may each include a serpentine pattern. The shape of the channels 74 is also optimized to provide adequate cooling in the event of plugged channels. The disclosed embodiments of the inner turbine shroud segment 60 may enable cooling with less air (e.g., than typical cooling systems for turbine shrouds) resulting in reduced costs associated with chargeable air utilized in cooling.

Figure 8A:
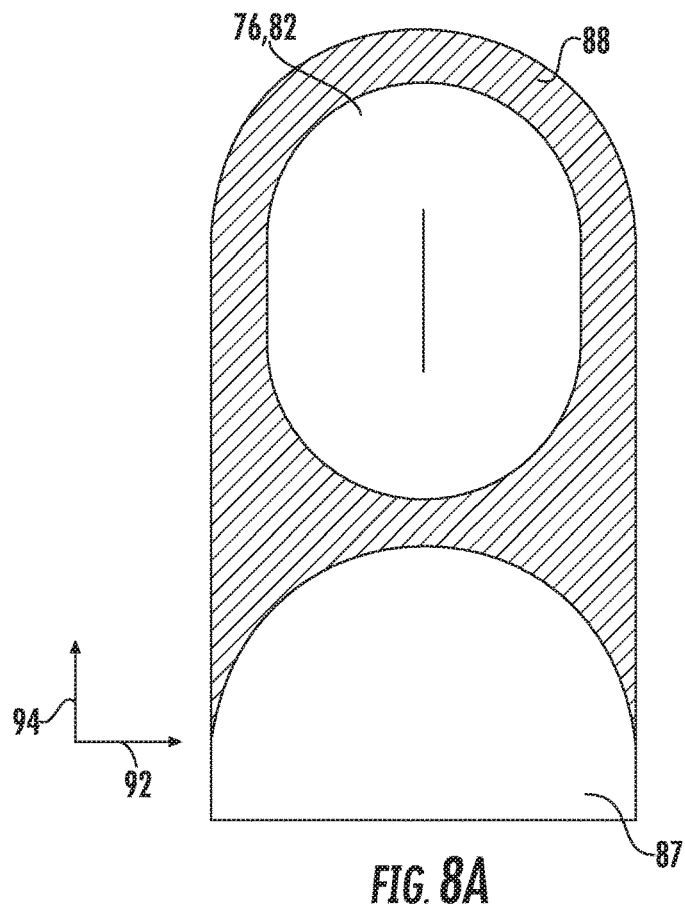
FIGS. 8A and 8B show different shapes of intake and exhaust ends that can be used with an enlarged transition manifold.
Figure 8B:
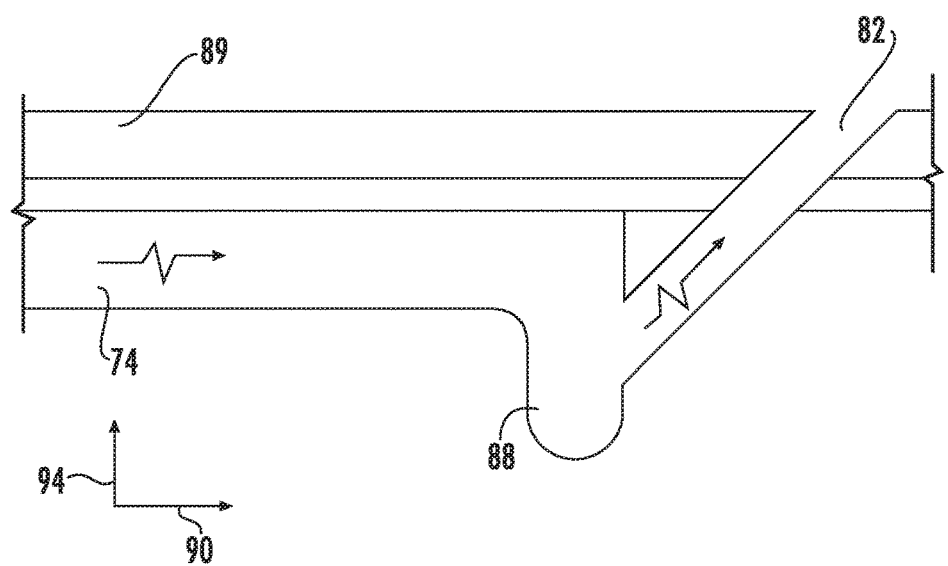

FIGS. 8A and 8B show additional shapes and features for the transition manifold 88. FIG. 8A shows a deep plunge for the transition manifold 88 that can bypass existing micro-channels 87 near the surface with sufficient metal ligament to maintain structural integrity. A coating 89 can be applied to the surface of the main body 102 for thermal and structural protection. The deep plunge enables larger or racetrack holes for intake end 76 and/or exhaust end 82 connections. FIG. 8B shows extra plunge depth of the transition manifold 88 at the exit that can enable larger L/D (Length/Diameter) film holes at the exhaust end 82.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooled structure of a gas turbine engine, comprising;
    a main body having a leading edge, a trailing edge opposite the leading edge, a first side portion, a second side portion opposite the first side portion, and a cavity, wherein the first side portion and the second side portion extend axially between the leading edge and the trailing edge;
    first cooling air micro-channels extending from the cavity and arranged along the first side portion;
    second cooling air micro-channels extending from the cavity and arranged along the second side portion; and
    at least one transition manifold in fluid communication with each micro-channel of the first cooling air micro-channels and the second cooling air micro-channels, the at least one transition manifold being in fluid communication with at least one of an intake end and an exhaust end, the intake end being a loop-shaped intake end;
    wherein each cooling air micro-channel of the first cooling air micro-channels comprises a transition manifold of the at least one transition manifold positioned within a central portion of the loop-shaped intake end of a respective, adjacent cooling air micro-channel of the second cooling air micro-channels.

2. The cooled structure of claim 1, comprising third cooling air micro-channels extending from the cavity and arranged along the leading edge and trailing edge.

3. The cooled structure of claim 1, wherein the at least one transition manifold has a cross-sectional area that is greater than or equal to a cross-sectional area of a micro-channel in fluid communication with the at least one transition manifold.

4. The cooled structure of claim 1, wherein the at least one transition manifold extends in a generally radially outward direction.

5. The cooled structure of claim 1, wherein the intake end is in fluid communication with the cavity.

6. The cooled structure of claim 1, wherein the exhaust end is in fluid communication with a gas turbine hot gas path.

7. The cooled structure of claim 1, wherein the cavity is positioned radially outward from a combustion gas side of the main body, the cavity further defining an angled perimeter wall.

8. The cooled structure of claim 7, wherein each intake end is positioned around the angled perimeter wall and configured to accept compressed cooling air from a cooling flow path.

9. A gas turbine, comprising:
    a compressor section;
    a combustion section positioned downstream from the compressor section;
    a turbine section positioned downstream from the combustion section;
    wherein the gas turbine comprises a plurality of cooled structures, each cooled structure comprising:
    a main body having a leading edge, a trailing edge opposite the leading edge, a first side portion, a second side portion opposite the first side portion, and a cavity, wherein the first side portion and the second side portion extend axially between the leading edge and the trailing edge;

first cooling air micro-channels extending from the cavity and arranged along the first side portion;

second cooling air micro-channels extending from the cavity and arranged along the second side portion; and at least one transition manifold in fluid communication with each micro-channel of the first cooling air micro-channels and the second cooling air micro-channels, the at least one transition manifold being in fluid communication with at least one of an intake end and an exhaust end, the intake end being a loop-shaped intake end;

wherein each cooling air micro-channel of the first cooling air micro-channels comprises a transition manifold of the at least one transition manifold positioned within a central portion of the loop-shaped intake end of a respective, adjacent cooling air micro-channel of the second cooling air micro-channels.

10. The gas turbine of claim 9 comprising third cooling air micro-channels extending from the cavity and arranged along the leading edge and the trailing edge.

11. The gas turbine of claim 9, wherein the at least one transition manifold has a cross-sectional area that is greater than or equal to a cross-sectional area of a micro-channel in fluid communication with the at least one transition manifold.

12. The gas turbine of claim 9, wherein the intake end is in fluid communication with the cavity.

13. The gas turbine of claim 9, wherein the exhaust end is in fluid communication with a gas turbine hot gas path.

14. The gas turbine of claim 9, wherein the cavity is positioned radially outward from a combustion gas side of the main body, the cavity further defining an angled perimeter wall.

15. The gas turbine of claim 14, wherein each intake end is positioned around the angled perimeter wall and configured to accept compressed cooling air from a cooling flow path.

* * * * *